UNITED STATES PATENT OFFICE.

GEORGE A. THOMSON, OF SOMERVILLE, NEW JERSEY.

ARC-LAMP ELECTRODE.

961,269.  Specification of Letters Patent.  Patented June 14, 1910.

No Drawing.  Application filed September 24, 1908.  Serial No. 454,572.

*To all whom it may concern:*

Be it known that I, GEORGE A. THOMSON, of Somerville, in the county of Somerset and State of New Jersey, have invented certain new and useful Improvements in Arc-Lamp Electrodes; and I do hereby declare the following to be a full, clear, and exact description of the invention, such as will enable others skilled in the art to which it appertains to make and use the same.

This invention relates to improvements in electrodes for electric arc lamps,—the object of the invention being to provide an electrode which will be highly efficient to insure an arc of large size and great luminosity and one in which the light produced shall be clear, white and steady.

I have discovered that with the use in an electric arc lamp of a metallic electrode containing molybdic material, an arc of great brilliancy can be produced and that the light from such arc will be white and of maximum volume. The molybdic material may be in the form of metallic molybdenum, associated with a material having greater electrical conductivity than metallic molybdenum. The molybdenum oxid may be in comminuted form and held together by suitable binding material, and other material, (such as metallic iron), will preferably be added to increase the conductivity of the electrode. Excellent results have been attained with the use of an electrode containing as much as eighty six per cent. metallic molybdenum. I have also found that an arc of large volume and great brilliancy giving white light, can be produced with the use of an electrode employing concentrates made from molybdenum ore containing approximately fifteen per cent. oxid of molybdenum, said concentrates being inclosed within an iron tube.

An arc of great volume and brilliancy with white light, can be produced with the use of a ferro-molybdenum electrode containing approximately ten per cent. of metallic molybdenum and ninety per cent. metallic iron.

Having fully described my invention what I claim as new and desire to secure by Letters-Patent, is:—

1. An electrode containing oxid of molybdenum.

2. An electrode containing oxid of molybdenum and a material having greater electrical conductivity.

In testimony whereof, I have signed this specification in the presence of two subscribing witnesses.

GEORGE A. THOMSON.

Witnesses:
  FRANK S. SMITH,
  ROBERT G. KITTLE.